United States Patent
Kagimoto et al.

(10) Patent No.: US 8,422,433 B2
(45) Date of Patent: *Apr. 16, 2013

(54) BASE STATION APPARATUS, COMMUNICATION CONTROL SYSTEM, COMMUNICATION CONTROL METHOD, AND INTER-STATION CONTROL METHOD

(75) Inventors: Tomonari Kagimoto, Fukuoka (JP); Tatsuhiko Takata, Fukuoka (JP); Yohji Fukuzawa, Fukuoka (JP); Akihiro Sato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,634

(22) Filed: Mar. 15, 2012

(65) Prior Publication Data

US 2012/0177007 A1 Jul. 12, 2012

Related U.S. Application Data

(62) Division of application No. 12/479,993, filed on Jun. 8, 2009, now Pat. No. 8,169,971.

(30) Foreign Application Priority Data

Sep. 18, 2008 (JP) ................................. 2008-239952

(51) Int. Cl.
*H04W 4/00* (2009.01)
(52) U.S. Cl.
USPC .......................................... 370/328; 370/331
(58) Field of Classification Search .................. 370/328, 370/331
See application file for complete search history.

(56) References Cited

U.S. PATENT DOCUMENTS

| | | | |
|---|---|---|---|
| 7,039,408 | B2 | 5/2006 | Chitrapu et al. |
| 2001/0005402 | A1 | 6/2001 | Nagatani et al. |
| 2004/0264476 | A1 | 12/2004 | Alarcon et al. |
| 2005/0047521 | A1 | 3/2005 | Ishikawa et al. |

(Continued)

FOREIGN PATENT DOCUMENTS

| | | |
|---|---|---|
| EP | 1124400 | 8/2001 |
| GB | 2337184 | 11/1999 |

(Continued)

OTHER PUBLICATIONS

Notice of Rejection dated Feb. 28, 2012 from the corresponding Japanese Application No. 2008-239952, with English translation.

(Continued)

*Primary Examiner* — Farah Faroul
(74) *Attorney, Agent, or Firm* — Katten Muchin Rosenman LLP

(57) ABSTRACT

A base station apparatus includes a determining unit that determines whether a direct link has been established between the base station apparatus and another base station apparatus, when a mobile device makes a request to switch a communication recipient from the base station apparatus to the other base station apparatus; a link information acquiring unit that acquires, indirectly from the other base station apparatus, link information necessary for establishing the direct link to the other base station apparatus, when the determining unit determines that no direct link to the other base station apparatus has been established; and a link requesting unit that requests the other base station apparatus to establish the direct link to the base station apparatus, based on the link information of the other base station apparatus acquired by the link information acquiring unit.

5 Claims, 13 Drawing Sheets

U.S. PATENT DOCUMENTS

| | | | |
|---|---|---|---|
| 2005/0068102 A1 | 3/2005 | Hongo et al. | |
| 2005/0147062 A1* | 7/2005 | Khouaja et al. | 370/332 |
| 2005/0221828 A1 | 10/2005 | Wakuta et al. | |
| 2010/0120430 A1 | 5/2010 | Hayashi | |
| 2010/0142407 A1 | 6/2010 | Serravalle | |
| 2010/0202410 A1 | 8/2010 | Watanabe et al. | |
| 2010/0248723 A1* | 9/2010 | Yasuoka | 455/436 |
| 2012/0100860 A1* | 4/2012 | Lei et al. | 455/438 |
| 2012/0129499 A1* | 5/2012 | Li | 455/411 |
| 2012/0307796 A1* | 12/2012 | Liu et al. | 370/331 |

FOREIGN PATENT DOCUMENTS

| | | |
|---|---|---|
| JP | 2001189685 | 7/2001 |
| JP | 2002209241 | 7/2002 |
| JP | 2005101908 | 4/2005 |
| WO | 99/34627 | 7/1999 |
| WO | 03103163 | 12/2003 |
| WO | 2009066337 | 5/2009 |

OTHER PUBLICATIONS

Ericsson, X2 NRL self-configuration, 3GPP TSG-RAN WG3 #60 Tdoc R3-08 1462, May 2008.

"NCL Optimization and Related Architecture" 3GPP TSG-SA5 (Telecom Management), S5-071485, Meeting SA5#55, Aug. 27-31, 2007, Bucharest, Romania.

Sujuan Feng, et al. "Self-Organizing Networks (SON) in 3GPP Long Term Evolution" pp. 1-15, May 20, 2008, retrieved from: http://www.nomor.de/uploads/gc/TQ/gcTQfDWApo9osPfQwQoBzw/SelfOrganisingNetworksInLTE_2008-05.pdf.

European Search Report dated Dec. 22, 2009, from the corresponding European Application No. 09007978.1.

U.S. Notice of Allowance dated Dec. 28, 2011, from the corresponding U.S. Appl. No. 12/479,993.

U.S. Office Action dated Sep. 30, 2011, from the corresponding U.S. Appl. No. 12/479,993.

\* cited by examiner

FIG.7

| WIRELESS BASE STATION NUMBER | INTER-STATION LINK SETTING STATE | IP ADDRESS | PORT NUMBER |
|---|---|---|---|
| 1 | SET | 192.0.1.1 | 100 |
| 2 | UNSET | 192.0.2.1 | 110 |
| ... | ... | ... | ... |
| 100 | SET | 192.0.1.100 | 100 |

FIG.8

| WIRELESS BASE STATION NUMBER | NUMBER OF PERFORMED S1 HANDOVERS | NUMBER OF PERFORMED X2 HANDOVERS |
|---|---|---|
| 1 | 0 | 30 |
| 2 | 12 | 0 |
| ... | ... | ... |
| 100 | 0 | 1 |

BASE STATION APPARATUS, COMMUNICATION CONTROL SYSTEM, COMMUNICATION CONTROL METHOD, AND INTER-STATION CONTROL METHOD

CROSS-REFERENCE TO RELATED APPLICATION(S)

This application is based upon and claims the benefit of priority of the prior Japanese Patent Application No. 2008-239952, filed on Sep. 18, 2008, the entire contents of which are incorporated herein by reference.

FIELD

The embodiments are discussed herein are directed to a base station apparatus, a communication control system, a communication control method, and an inter-station control method that can reduce the processing load imposed on an evolved packet core (EPC) on each handover between wireless base stations.

BACKGROUND

To make a smooth migration from the third generation (3G) mobile communication to the fourth generation (4G) mobile communication, a long term evolution (LTE: super 3G) has been developed as a standard for high-speed mobile communication. Although the LTE is regarded as an evolution of the international mobile telecommunications (IMT)-2000, a wireless interface and a radio access controller (RAC) architecture of the 3G system have been reexamined fundamentally to make a smooth migration to the 4G. As a result, with delay time compression and improvement in communication speed, the LTE achieves maximum data communication speed of 300 megabits per second for downloading, and of 50 megabits per second for uploading.

Mobile communication systems according to the LTE have undergone some changes in nodes from the current 3G systems. Specifically, because a plurality of wireless base stations is centrally managed by an evolved packet core (EPC), radio network controllers (RNCs) provided in conventional 3G systems are omitted and most functions of the RNCs are provided in the wireless base stations.

In communication between wireless base stations according to the LTE, a message in an S1 protocol is used when the communication is performed through the EPC, while a message in an X2 protocol is used when the communication is performed not through the EPC, as specified in the recommendations of the third generation partnership project (3 GPP). To use such messages in the X2 protocol and the S1 protocol, it is necessary for each wireless base station to establish setting links to another wireless base station to communicate with and to the EPC, respectively.

In general, such an inter-station link is set or removed when a wireless base station is set up, or when the number of neighboring wireless base stations is increased or decreased. Desirably, inter-station links are set for all of the neighboring base stations. Under existing circumstances, however, when inter-station links are set for many neighboring wireless base stations, the processes for setting the inter-station links are increased, thus causing time delay in restarting mobile communication interrupted during the setting. Further, when many inter-station links are set, resources necessary for setting the inter-base links run out because they are limited. For these reasons, attempts have been made to reduce the number of neighboring wireless base stations for which inter-station links are set as much as possible.

Considering the existing circumstances for setting the inter-station links, the recommendations of the 3 GPP define a process for switching a wireless link between a mobile device and a wireless base station according to movement of the mobile device, when the mobile device moves from a wireless base station to another wireless base station (the process is referred to as "handover"). Specifically, the 3 GPP defines: X2 handover using an inter-station link between wireless base stations; and S1 handover using an inter-station link between a wireless base station and an EPC, either of which is used according to the movement of a mobile device from a wireless base station to another wireless base station.

Referring to FIG. 16, the following describes operations of handover in mobile communication using the LTE. As shown in FIG. 16, in the mobile communication system using the LTE, a plurality of wireless base stations (A, B, X, Y, and C) is directly connected to an EPC, and an inter-station link is set between each of the wireless base stations and the EPC. The wireless base station X has an inter-station link to the wireless base station A, while having no inter-station link to the other wireless base stations B, Y, and C. In this situation, for example, when a mobile device being in wireless communication with the wireless base station X moves into a control region of the wireless base station A, X2 handover is performed because the wireless base station A has an inter-station link to the wireless base station X. On the contrary, when a mobile device being in wireless communication with the wireless base station X moves into a control region of the wireless base station C, X2 handover cannot be performed and S1 handover is performed because the wireless base station C has no inter-station link to the wireless base station X.

The PCT International Publication WO99/34627 Pamphlet discloses the following technology. Assume that a mobile device being in wireless communication with the wireless base station X moves into a region where no wireless base station exists as a recipient of handover. In this case, by reducing the number of handover requests regularly made by the mobile device, the voice interruption caused by handover operations is reduced. In this way, the communication quality is improved between the mobile device and a wireless base station.

When handover is made from a wireless base station being in wireless communication with many mobile devices to another wireless base station having no inter-station link to the wireless base station, S1 handover is performed for every handover. This poses a problem of increasing the processing load on the EPC.

Referring to FIG. 17, the following describes the problem regarding the load on the EPC in detail. As shown in FIG. 17, the wireless base stations X and C each have an inter-station link to the EPC, while having no inter-station link therebetween. In this situation, when many mobile devices being in wireless communication with the wireless base station X move into a control region of the wireless base station C, the wireless base stations X and C cannot perform X2 handover because no inter-station link has been set therebetween. Thus, the wireless base stations X and C perform S1 handover every time such a mobile device moves in. This increases the processes for performing S1 handover in the EPC, thus increasing the processing load thereon.

Particularly in the LTE, it is assumed that one EPC controls many wireless base stations. When a plurality of wireless base stations makes many requests for S1 handover at one time, the EPC has a further increased processing load. As a result, the handover may fail, degrading the services to be provided to existing callers.

SUMMARY

According to an aspect of the invention, a base station apparatus includes a determining unit that determines whether a direct link has been established between the base station apparatus and another base station apparatus, when a mobile device makes a request to switch a communication recipient from the base station apparatus to the other base station apparatus; a link information acquiring unit that acquires, indirectly from the other base station apparatus, link information necessary for establishing the direct link to the other base station apparatus, when the determining unit determines that no direct link to the other base station apparatus has been established; and a link requesting unit that requests the other base station apparatus to establish the direct link to the base station apparatus, based on the link information of the other base station apparatus acquired by the link information acquiring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 7 depicts a data structure of wireless base station information;

FIG. 8 depicts a data structure of handover execution information;

DESCRIPTION OF EMBODIMENT(S)

Preferred embodiments of a wireless base station and a communication control system that use an LTE according to the present invention are described in detail with reference to the accompanying drawings. The present invention is not limited to the embodiments.

First Embodiment

Figure 1:
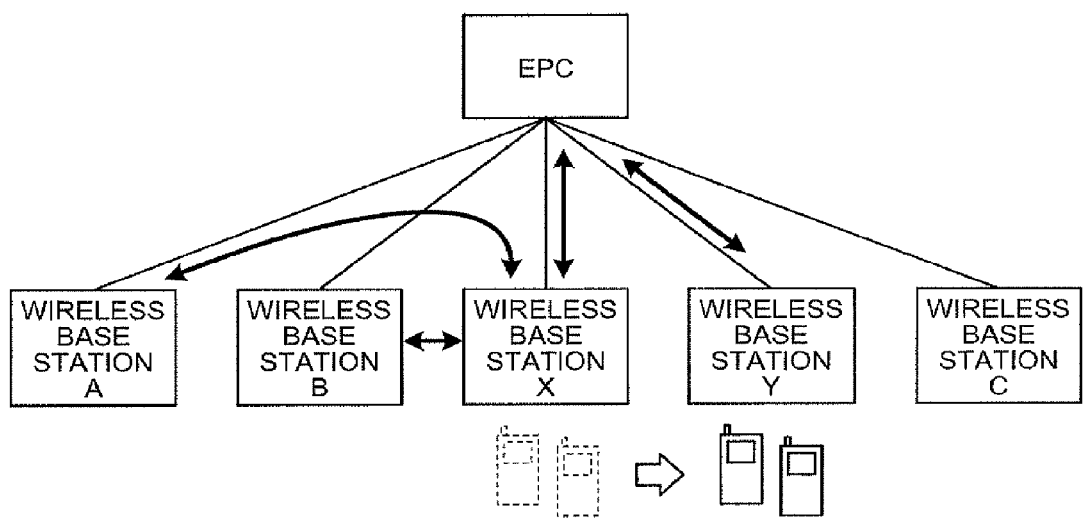
FIG. 1 is a schematic of an entire communication control system according to a first embodiment of the present invention.

FIG. 1 is a schematic of an entire communication control system according to a first embodiment of the present invention. As shown in FIG. 1, the communication control system includes an EPC, a plurality of wireless base stations A, B, C, X, and Y, and mobile communication terminals.

Through wired communication, the EPC controls paths and data transmission and reception between wireless base stations allocated in its control region. For example, when a mobile communication terminal makes a handover from a wireless base station to another wireless base station, the EPC controls transmission and reception of messages between the wireless base stations for the handover, and switches the wired path (path switching).

Each mobile communication terminal transmits and receives a message to and from a wireless base station with which the mobile communication terminal is in wireless communication. For example, when making a handover from a wireless base station to another wireless base station, the mobile communication terminal transmits a handover request requesting switching of the wireless path to a wireless base station with which the mobile communication terminal is in wireless communication. From the wireless base station having received the handover request, the mobile communication terminal receives a response to the handover request, establishes a wireless path to a new wireless base station, and transmits a handover completion notification, indicating the completion of switching the wireless path, to the new wireless base station using the established wireless path. Although the mobile communication terminal is described as a mobile telephone, the mobile communication terminal may be a personal computer, a workstation, a home game console, an internet television (TV), a personal digital assistant (PDA), a portable telephone, a personal handyphone system (PHS), or other type of mobile communication terminal widely available.

The wireless base stations A, B, C, X, and Y are allocated in a control region of the EPC, and each have an inter-station link in an S1 protocol to communicate with a neighboring wireless base station through the EPC. Thus, the wireless base station X communicates with its neighboring wireless base station Y through the EPC. Further, the wireless base station X has an inter-station link in an X2 protocol to communicate directly with its neighboring wireless base station, for example with the wireless base station A or B. This allows the wireless base station X to communicate with its neighboring wireless base station A or B not through the EPC. Each of the wireless base stations allocated in the control region of the EPC has an inter-station link in the S1 protocol to the EPC.

Assume that a mobile communication terminal switches a communication recipient from the wireless base station X to the wireless base station Y. In this case, when no inter-station link in the X2 protocol has been set to the wireless base station Y, the wireless base station X acquires, from the wireless base station Y through the EPC, setting information necessary for setting an inter-station link in the X2 protocol to the wireless base station Y. The wireless base station X then makes a request to set an inter-station link in the X2 protocol to the wireless base station Y by using the setting information acquired from the wireless base station Y, and the wireless base station Y sets an inter-station link in the X2 protocol to the wireless base station X. This enables the wireless base station X to transmit and receive a message directly to and from the wireless base station Y. Thus, the wireless base station X can exchange a message directly with the wireless base station Y in the next handover. This reduces the processing load to be imposed on the EPC on each handover. The processes performed by the wireless base stations X and Y will be described in detail later.

Figure 2:
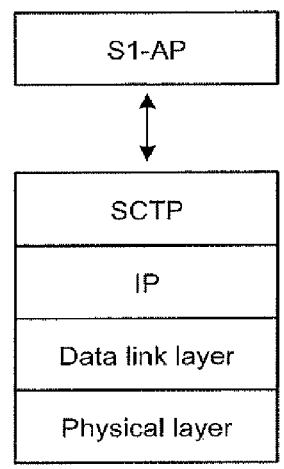
FIG. 2 is a schematic of a protocol stack of S1 protocols.
Figure 3:
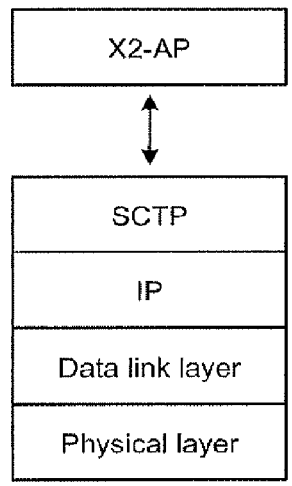
FIG. 3 is a schematic of a protocol stack of X2 protocols.

Referring to FIGS. 2 and 3, the following describes a protocol stack of S1 protocols specifying an inter-station link between the EPC and each wireless base station, and a protocol stack of X2 protocols specifying an inter-station link between wireless base stations. The S1 protocol and the X2 protocol are specified in the recommendations of the 3 GPP.

FIG. 2 is a schematic of a protocol stack of S1 protocols. As shown in FIG. 2, the bottom layer is physical layer software such as a device driver, on which data link layer software, network layer software such as an internet protocol (IP), and a transport layer, i.e., a stream control transmission protocol (SCTP) are stacked in this order from bottom to top. The S1 application software in the top application layer sets an SCTP link (inter-station link) to the EPC, thereby communicating with the EPC by using messages in the S1 protocol. As a result, the wireless base station X performs handover with the wireless base station Y through the EPC by using messages in the S1 protocol.

FIG. 3 is a schematic of a protocol stack of X2 protocols. As shown in FIG. 3, the protocol stack of X2 protocols has a configuration similar to that of the protocol stack of S1 protocols, and the descriptions thereof are omitted. The X2 application software in the top application layer sets an SCTP link (inter-station link) to that of another wireless base station, thereby communicating with the wireless base station having the inter-station link by using messages in an X2 protocol. As a result, after setting such an inter-station link in the X2 protocol, the wireless base station X performs handover directly with the wireless base station Y by using messages in the X2 protocol.

Figure 4:
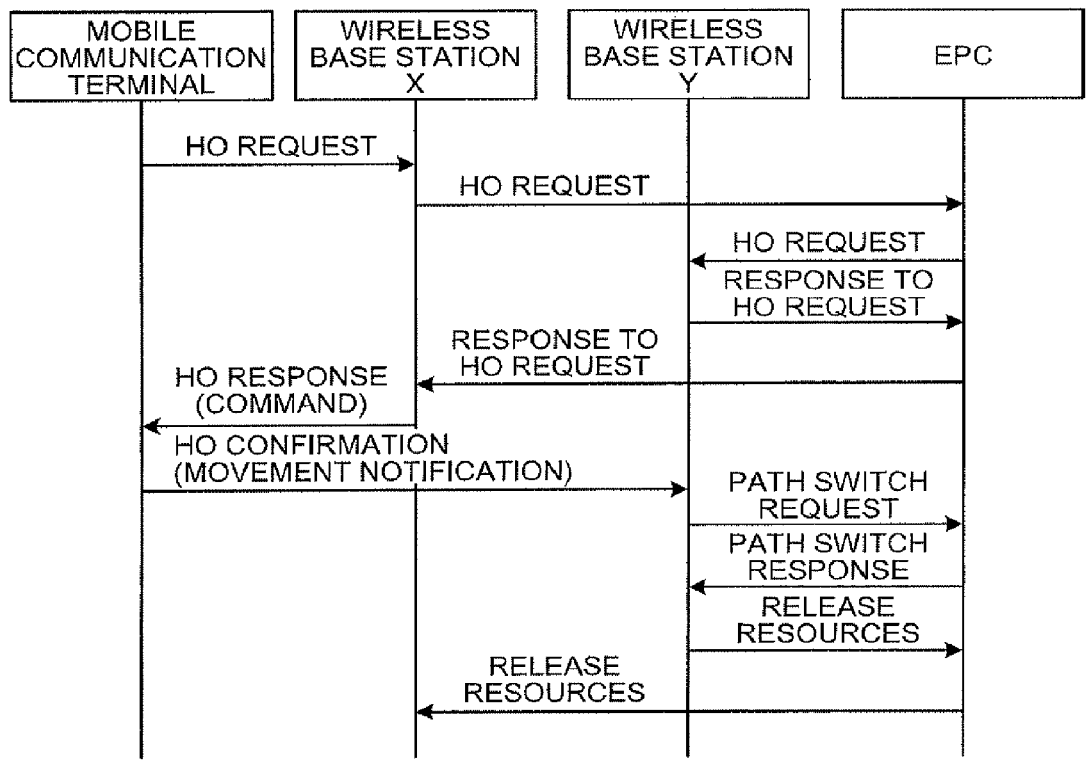
FIG. 4 is a simplified sequence diagram of a procedure of S1 handover.
Figure 5:
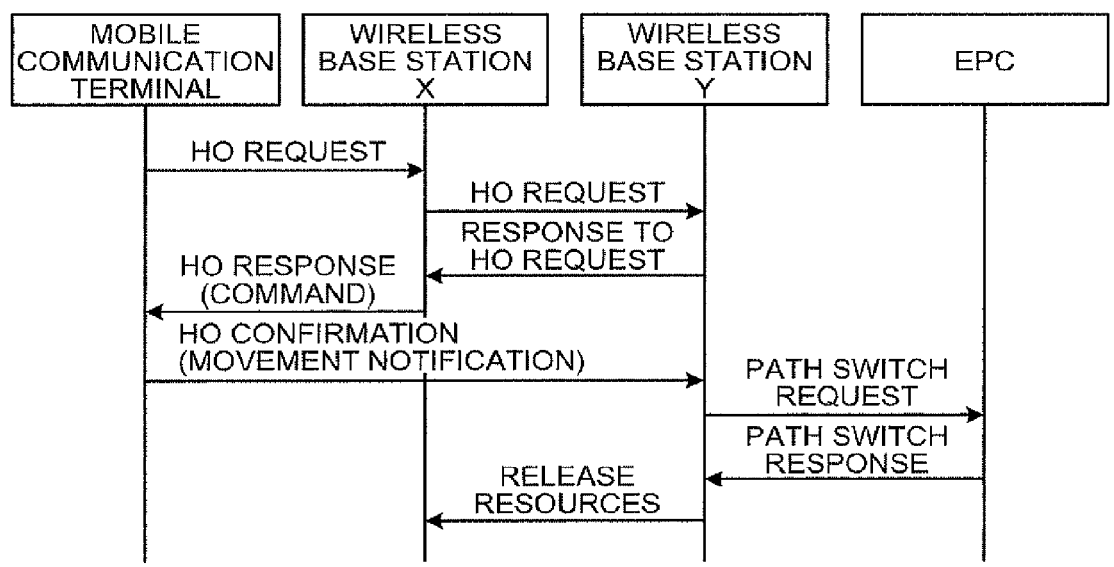
FIG. 5 is a simplified sequence diagram of a procedure of X2 handover.

Referring to FIGS. 4 and 5, the following briefly describes a procedure of S1 handover using an inter-station link in the S1 protocol, and a procedure of X2 handover using an inter-station link in the X2 protocol. The S1 handover refers to handover using an inter-station link in the S1 protocol, and X2 handover refers to handover using an inter-station link in the X2 protocol. Suppose that a mobile communication terminal performing wireless communication with the wireless base station X moves into a control region of the wireless base station Y.

FIG. 4 is a simplified sequence diagram depicting a procedure of S1 handover performed when no inter-station link in the X2 protocol has been set. As shown in FIG. 4, when a mobile communication terminal moves from a control region of the wireless base station X into a control region of the wireless base station Y, the mobile communication terminal transmits a handover (HO) request to the wireless base station X with which the mobile communication terminal is in wireless communication. Because no inter-station link in the X2 protocol has been set to the wireless base station Y, the wireless base station X cannot use X2 handover, and thus transmits the handover request to the wireless base station Y through the EPC. Receiving the handover request, the wireless base station Y establishes a wireless path to the EPC, and transmits a response to the handover request to the wireless base station X through the EPC. Receiving the response to the handover request, the wireless base station X transmits a handover command to the mobile communication terminal. The mobile communication terminal establishes a wireless path to the wireless base station Y, and transmits a movement notification to the destination, i.e., the wireless base station Y. Receiving the movement notification, the wireless base station Y transmits to the EPC a path switch request to switch the wired path of the mobile communication terminal, from a wired path via the wireless base station X to a wired path via the wireless base station Y. Receiving the path switch request, the EPC switches the wired path via the wireless base station X to the wired path via the wireless base station Y, and then transmits a path switch response to the wireless base station Y. Receiving the path switch response, the wireless base station Y transmits a command to release resources to the wireless base station X through the EPC. The wireless base station X releases the resources used to perform wireless communication with the mobile communication terminal, and S1 handover is terminated.

FIG. 5 is a simplified sequence diagram depicting a procedure of X2 handover performed when an inter-station link in the X2 protocol has been set. In FIG. 5, an inter-station link in the X2 protocol is set between the wireless base stations X and Y. As shown in FIG. 5, when a mobile communication terminal moves from a control region of the wireless base station X into a control region of the wireless base station Y, the mobile communication terminal transmits a handover (HO) request to the wireless base station X with which the mobile communication terminal is in wireless communication. Because the inter-station link in the X2 protocol has been set to the wireless base station Y, the wireless base station X transmits the handover request to the wireless base station Y. Receiving the handover request, the wireless base station Y establishes a wireless path to the wireless base station X, and transmits a response to the handover request thereto. Receiving the response to the handover request, the wireless base station X transmits a handover command to the mobile communication terminal. The mobile communication terminal establishes a wireless path to the wireless base station Y, and transmits a movement notification to the destination, i.e., the wireless base station Y. Receiving the movement notification, the wireless base station Y transmits to the EPC a path switch request to switch the wired path of the mobile communication terminal, from a wired path via the wireless base station X to a wired path via the wireless base station Y. Receiving the path switch request, the EPC switches the wired path via the wireless base station X to the wired path via the wireless base station Y, and then transmits a path switch response to the wireless base station Y. Receiving the path switch response, the wireless base station Y transmits a command to release resources to the wireless base station X. The wireless base station X releases the resources used to perform wireless communication with the mobile communication terminal, and X2 handover is terminated.

As to the number of times of transmission and reception to and from the EPC, the procedure of X2 handover is about ¼ the procedure of S1 handover. Thus, when many mobile communication terminals switch their communication recipient from the wireless base station X to the wireless base station Y, the processing load on the EPC can be reduced in X2 handover more than in S1 handover.

Figure 6:
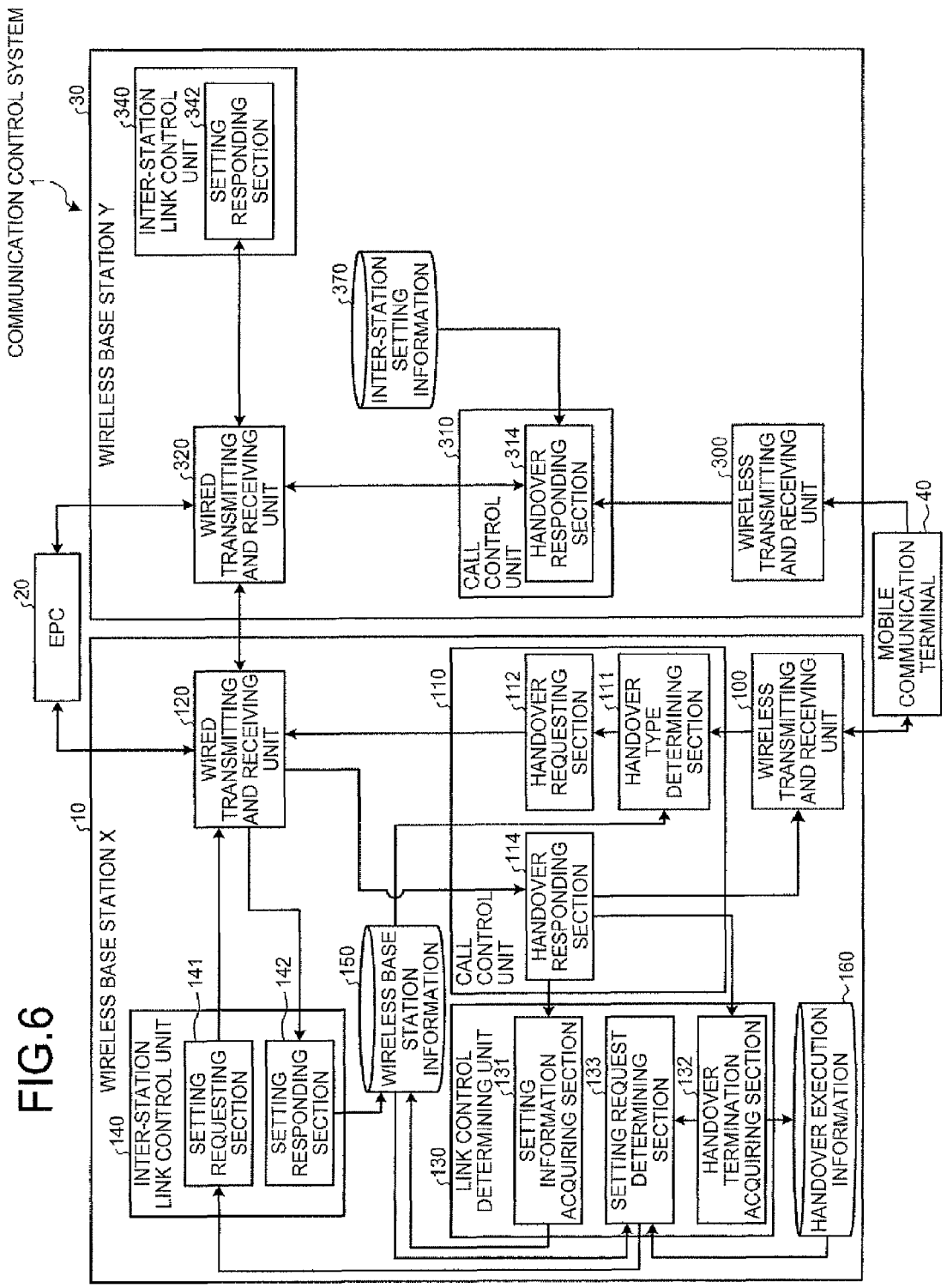
FIG. 6 is a functional block diagram of the entire communication control system shown in FIG. 1.

FIG. 6 is a functional block diagram of the entire communication control system according to the first embodiment. As shown in FIG. 6, a communication control system 1 includes a wireless base station X 10, an EPC 20, a wireless base station Y 30, and a mobile communication terminal 40.

The wireless base station X 10 includes a wireless transmitting and receiving unit 100, a call control unit 110, a wired transmitting and receiving unit 120, a link control determining unit 130, an inter-station link control unit 140, and wireless base station information 150, and handover execution information 160.

The wireless transmitting and receiving unit 100 transmits and receives a control signal to and from the mobile communication terminal 40. Specifically, the wireless transmitting and receiving unit 100 receives a handover request, transmitted from the mobile communication terminal 40 and made to the wireless base station Y 30, and then outputs the handover request to a handover type determining section 111. The wireless transmitting and receiving unit 100 also receives a handover response to the handover request from a handover responding section 114, and transmits the handover response to the mobile communication terminal 40.

The call control unit 110 controls calls of each mobile communication terminal, depending on a message received from the wireless base station Y 30, the EPC 20, or the mobile communication terminal 40. The call control unit 110 includes the handover type determining section 111, a handover requesting section 112, and the handover responding section 114.

The handover type determining section 111 acquires from the wireless transmitting and receiving unit 100 a handover request made to the wireless base station Y 30, so as to determine whether an inter-station link in an X2 protocol (hereinafter, "inter-station link") has been set to the wireless base station Y 30. Specifically, the handover type determining section 111 refers to an inter-station setting state stored in the wireless base station information 150 and indicating whether an inter-station link has been set to each wireless base station, so as to determine whether the inter-station link has been set to the wireless base station Y 30. If no inter-station link has been set to the wireless base station Y 30, the handover type determining section 111 attempts to request the wireless base station Y 30 through the EPC 20, for the setting information necessary for setting the inter-station link. Thus, the handover type determining section 111 outputs to the handover requesting section 112 a notification that a wireless base station number and inter-station link setting information of the wireless base station Y 30 are requested. On the contrary, if an inter-station link has been set to the wireless base station Y 30, the handover type determining section 111 has no need to request the wireless base station Y 30 for the setting information necessary for setting the inter-station link. Thus, the handover type determining section 111 outputs to the handover requesting section 112 a notification that the wireless base station number and the inter-station link setting information of the wireless base station Y 30 are not requested.

When acquiring, from the handover type determining section 111, the notification that the wireless base station number and the inter-station link setting information of the wireless base station Y 30 are requested, the handover requesting section 112 outputs, to the wired transmitting and receiving unit 120, a handover request that requests switching of the wireless path using S1 handover and that includes a request for the inter-station link setting information of the wireless base station Y 30 (hereinafter, "S1 handover request"). On the contrary, when acquiring, from the handover type determining section 111, the notification that the wireless base station number and the inter-station link setting information of the wireless base station Y 30 are not requested, the handover requesting section 112 outputs to the wired transmitting and receiving unit 120 a handover request that requests switching of the wired path using X2 handover and that includes information indicating that the request for the inter-station link setting information of the wireless base station Y 30 is not required (hereinafter, "X2 handover request").

The handover responding section 114 acquires a handover response from the wired transmitting and receiving unit 120, and outputs the inter-station link setting information of the wireless base station Y 30, included in the handover response, to a setting information acquiring section 131. The handover responding section 114 also acquires a request to switch the wired path of the mobile communication terminal 40 (path switch request) from the wired transmitting and receiving unit 120. In this case, the handover responding section 114 switches the wired path of the mobile communication terminal 40 from a wired path via the current wireless base station X 10 to a wired path via the wireless base station Y 30, and terminates the handover. The handover responding section 114 then outputs to a handover termination acquiring section 132 a handover termination notification including: the wireless base station number of the wireless base station Y 30; and information indicating whether either S1 handover or X2 handover has been performed.

The wired transmitting and receiving unit 120 transmits and receives a control signal to and from the EPC 20 and a neighboring wireless base station. Specifically, when acquiring an S1 handover request from the handover requesting section 112, the wired transmitting and receiving unit 120 transmits the S1 handover request to the EPC 20. On the contrary, when acquiring an X2 handover request from the handover requesting section 112, the wired transmitting and receiving unit 120 transmits the X2 handover request to the wireless base station Y 30. Further, when receiving a handover response from the EPC 20 or the wireless base station Y 30, the wired transmitting and receiving unit 120 outputs the received handover response to the handover responding section 114. The wired transmitting and receiving unit 120 also outputs a path switch request, received from the EPC 20 or the wireless base station Y 30, to the handover responding section 114. Further, when acquiring an SCTP link setting request made to the wireless base station Y 30 from a setting requesting section 141, the wired transmitting and receiving unit 120 transmits the SCTP link setting request to the wireless base station Y 30. The wired transmitting and receiving unit 120 then receives an SCTP link setting response to the SCTP link setting request from the wireless base station Y 30, and outputs the SCTP link setting response to a setting responding section 142.

The link control determining unit 130 acquires the inter-station link setting information of the wireless base station Y 30, to establish a link to the wireless base station Y 30. The link control determining unit 130 then determines whether to make a request to set the inter-station link to the wireless base station Y 30. The link control determining unit 130 includes the setting information acquiring section 131, a setting request determining section 133, and the handover termination acquiring section 132.

Acquiring the inter-station link setting information of the wireless base station Y 30 from the handover responding section 114, the setting information acquiring section 131 stores the acquired inter-station link setting information of the wireless base station Y 30, in the wireless base station information 150. Examples of the inter-station link setting information of the wireless base station Y 30 include an IP address and a port number of the wireless base station Y 30.

Acquiring the handover termination notification made to the wireless base station Y 30 from the handover responding section 114, the handover termination acquiring section 132 increments by one the number of handovers (S1 or X2) made to the wireless base station number of the wireless base station Y 30, and stores the incremented number in the handover execution information 160. The handover termination acquiring section 132 then outputs an inter-station link setting request command made to the wireless base station Y 30 to the setting request determining section 133.

The setting request determining section 133 acquires, from the handover termination acquiring section 132, the inter-station link setting request command made to the wireless base station Y 30. If the received request command matches the conditions for a request to set the inter-station link, the setting request determining section 133 outputs a request to set the inter-station link to the wireless base station Y 30 (i.e., inter-station link setting request) to the setting requesting section 141. Specifically, the setting request determining section 133 refers to the inter-station setting state stored in the wireless base station information 150 and indicating whether the inter-station link has been set to the wireless base station Y 30, so as to determine whether the inter-station link has been set to the wireless base station Y 30. If no inter-station link has been set to the wireless base station Y 30, the setting request determining section 133 refers to the handover execution information 160 and acquires the number of S1 handovers made to the wireless base station Y 30, so as to determine whether the number of the performed S1 handovers is equal to or greater than a predetermined number. The predetermined number is a number indicating how many times S1 handover is performed within a certain period of time and expected to trigger the processing load on the EPC 20 to exceed a predetermined reference value. The predetermined number is, for example, 10 per hour. If the number of performed handovers is equal to or greater than the predetermined number, the setting request determining section 133 outputs the inter-station link setting request made to the wireless base station Y 30 to the setting requesting section 141. In the foregoing, the setting request determining section 133 determines matching of the inter-station link setting request upon acquiring the inter-station link setting request command from the handover termination acquiring section 132. The setting request determining section 133 is not limited to this, and may make the determination regularly or irregularly.

The inter-station link control unit 140 manages an inter-station link to a neighboring wireless base station, inputs and outputs messages for setting an inter-station link, and sets an inter-station link. The inter-station link control unit 140 includes the setting requesting section 141 and the setting responding section 142.

The setting requesting section 141 acquires the inter-station link setting request made to the wireless base station Y 30 from the setting request determining section 133. The setting requesting section 141 then outputs an SCTP link setting request made to the wireless base station Y 30 to the wired transmitting and receiving unit 120. The inter-station link setting request includes an IP address of the wireless base station X 10, and a port number used to set an inter-station link to the wireless base station Y 30.

The setting responding section 142 acquires, from the wired transmitting and receiving unit 120, an SCTP link setting response from the wireless base station Y 30, and then stores information indicating that the inter-station link has been set to the wireless base station Y 30, in the wireless base station information 150.

The wireless base station information 150 stores therein the inter-station setting state of the wireless base station Y 30 neighboring the current wireless base station X 10, and setting information necessary for setting an inter-station link. Referring to FIG. 7, the following describes a data structure of the wireless base station information 150. As shown in FIG. 7, the wireless base station information 150 stores therein sets of information including: a wireless base station number uniquely identifying a wireless base station neighboring the current wireless base station; the inter-station link setting state; an IP address; and a port number, in a manner that the sets of information are associated with respective wireless base station numbers. The inter-station link setting state indicates whether an inter-station link has been set to the current wireless base station. For example, as the inter-station link setting state, "set" is held when the inter-station link has been set, while "unset" is held when no inter-station link has been set. The IP address is an IP address of a wireless base station corresponding to a wireless base station number. The port number is the number of a port used by a wireless base station corresponding to a wireless base station number to set an inter-station link to the current wireless base station.

Referring back to FIG. 6, the handover execution information 160 stores therein the number of handovers of each type (S1 or X2) made by the mobile communication terminal 40 from the current wireless base station X 10 to its neighboring wireless base station Y 30. Referring to FIG. 8, the following describes an example of a data structure of the handover execution information 160. As shown in FIG. 8, the handover execution information 160 stores therein sets of information including: a wireless base station number uniquely identifying a neighboring wireless base station; the number of performed S1 handovers; and the number of performed X2 handovers, in a manner that the sets of information are associated with respective wireless base station numbers. The number of performed S1 handovers and the number of performed X2 handovers stored in the handover execution information 160 are updated to zero every predetermined period of time. This allows the setting request determining section 133 to determine an execution frequency of S1 handovers and an execution frequency of X2 handovers every predetermined period of time. Thus, an inter-station link can be set according to the ever-changing processing load on the EPC 20. The predetermined period of time may be, for example, one hour or one day.

The wireless base station Y 30 includes a wireless transmitting and receiving unit 300, a call control unit 310, a wired transmitting and receiving unit 320, an inter-station link control unit 340, and an inter-station setting information 370.

The wireless transmitting and receiving unit 300 transmits and receives a control signal to and from the mobile communication terminal 40. Specifically, the wireless transmitting and receiving unit 300 receives a handover completion notification from the mobile communication terminal 40, and outputs the handover completion notification to a handover responding section 314.

The call control unit 310 controls calls of each mobile communication terminal, depending on a message received from the wireless base station Y 30, the EPC 20, or the mobile communication terminal 40. The call control unit 310 includes the handover responding section 314.

When acquiring an S1 handover request including a request for inter-station link setting information from the wired transmitting and receiving unit 320, the handover responding section 314 refers to the inter-station setting information 370 and acquires inter-station link setting information (an IP address and a port number) of the current wireless base station. The handover responding section 314 then creates a handover response including the acquired inter-link setting information, and outputs the handover response to the wired transmitting and receiving unit 320. On the other hand, when acquiring, from the wired transmitting and receiving unit 320, an X2 handover request including information indicating that the request for inter-station link setting information is not required, the handover responding section 314 outputs a handover response not including the inter-station link setting information to the wired transmitting and receiving unit 320.

The wired transmitting and receiving unit 320 transmits and receives a control signal to and from the EPC 20 and a neighboring wireless base station. Specifically, when acquiring a handover request from the EPC 20 or the wireless base station X 10, the wired transmitting and receiving unit 320 outputs the handover request to the handover responding section 314. On the contrary, when acquiring a handover response including the inter-station link setting information from the handover responding section 314, the wired transmitting and receiving unit 320 transmits the handover response to the EPC 20. Further, when acquiring an SCTP link setting request made to the current wireless base station Y 30 from the wireless base station X 10, the wired transmitting and receiving unit 320 outputs the SCTP link setting request to a setting responding section 342 to establish a link to the wireless base station X 10. On the contrary, when acquiring an SCTP link setting response to the SCTP link setting request from the setting responding section 342, the wired transmitting and receiving unit 320 transmits the SCTP link setting response to the wireless base station X 10.

The inter-station link control unit 340 manages an inter-station link to a neighboring wireless base station, and inputs and outputs a signal for setting the inter-station link. The inter-station link control unit 340 includes the setting responding section 342.

The setting responding section 342 acquires an SCTP link setting request from the wired transmitting and receiving unit 320, sets an inter-station link to the wireless base station X 10, and outputs an SCTP link setting response to the wired transmitting and receiving unit 320.

Figure 9:
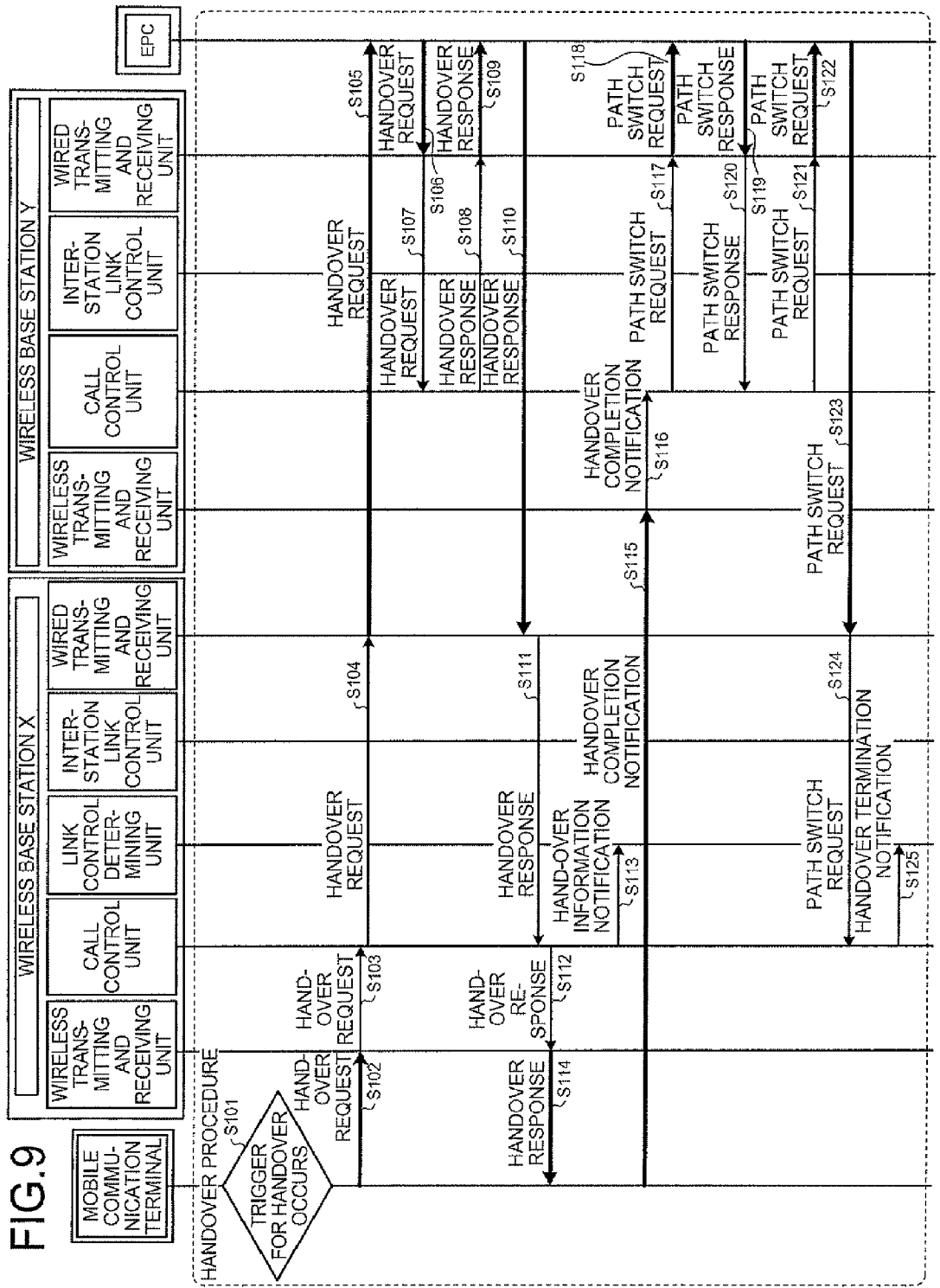
FIG. 9 is a sequence diagram of a handover procedure performed by the communication control system shown in FIG. 1.
Figure 10:
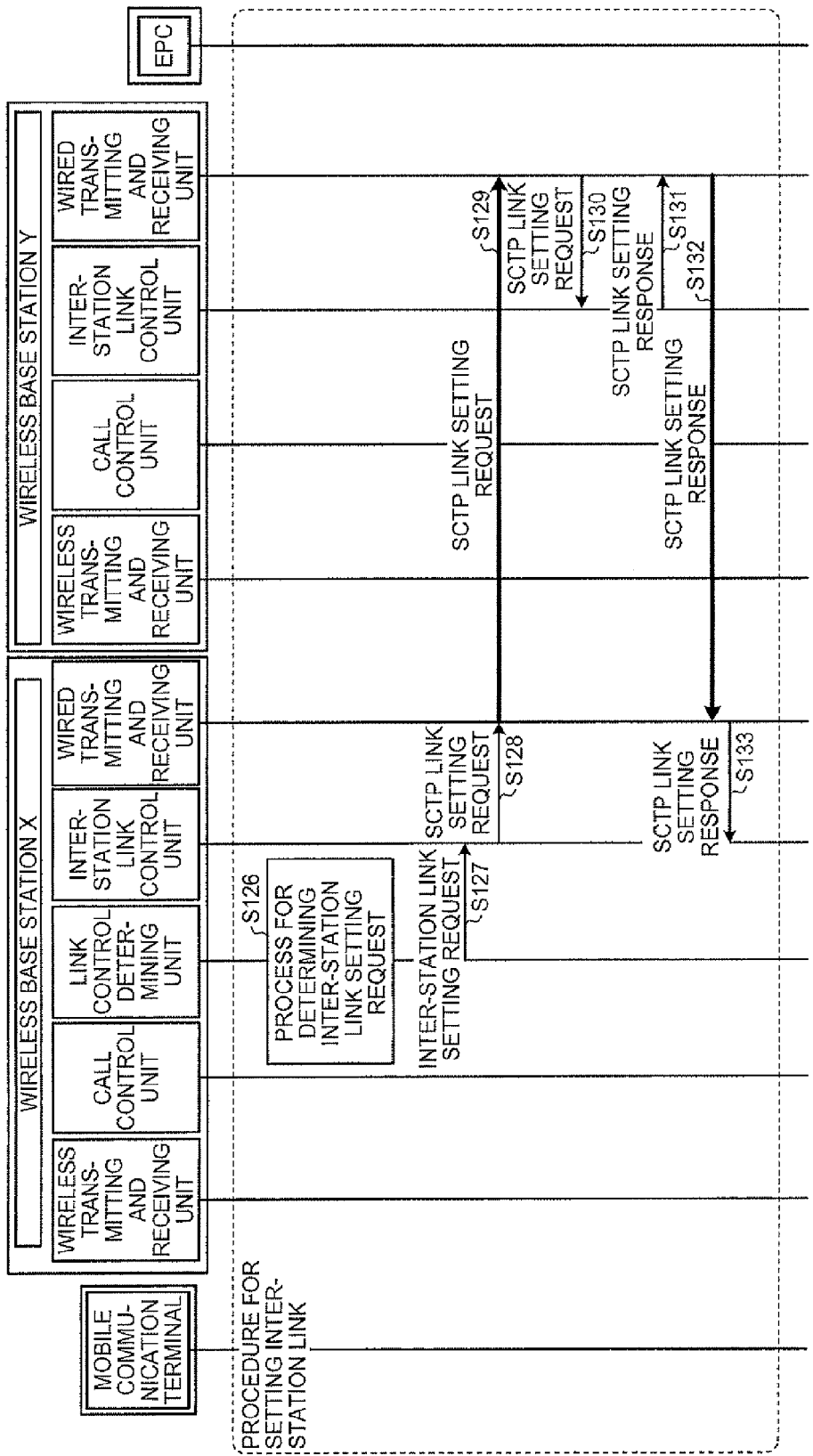
FIG. 10 is a sequence diagram of a procedure for setting an inter-station link in the communication control system shown in FIG. 1.

Referring to FIGS. 9 and 10, the following describes an entire process sequence performed by the communication control system according to the first embodiment. FIG. 9 depicts a handover procedure performed by the communication control system, and FIG. 10 depicts a procedure for setting an inter-station link. The mobile communication terminal 40 is in wireless communication with the wireless base station X 10. The wireless base station X 10 has no inter-station link in the X2 protocol to the wireless base station Y 30.

FIG. 9 depicts a sequence of a handover procedure performed by the communication control system according to the first embodiment.

When a user moves geographically for example, and enters a control region of the wireless base station Y 30, a trigger for handover occurs in the mobile communication terminal 40 (S101). The mobile communication terminal 40 then transmits a handover request to the wireless base station X 10 (S102).

Receiving the handover request, the wireless transmitting and receiving unit 100 of the wireless base station X 10 outputs the handover request to the handover type determining section 111 of the call control unit 110 (S103).

The handover type determining section 111 of the call control unit 110 refers to the inter-station setting state stored in the wireless base station information 150, so as to determine whether an inter-station link has been set to the wireless base station Y 30. If no inter-station link has been set to the wireless base station Y 30, the handover type determining section 111 transmits a handover request including a request for the setting information necessary for setting an inter-station link to the wireless base station Y 30, to the EPC 20 through the wired transmitting and receiving unit 120 (S104 to S105).

Receiving the handover request from the wireless base station X 10, the EPC 20 transmits the handover request to the wireless base station Y 30 (S106). Receiving the handover request from the EPC 20, the wired transmitting and receiving unit 320 of the wireless base station Y 30 outputs the handover request to the handover responding section 314 of the call control unit 310 (S107). Receiving the handover request, the handover responding section 314 acquires the inter-station link setting information of the current wireless base station according to the request for the setting information necessary for setting an inter-station link to the current wireless base station, included in the handover request. The handover responding section 314 then transmits the handover response including the acquired setting information to the EPC 20 through the wired transmitting and receiving unit 320 (S108 to S109).

Receiving the handover response from the wireless base station Y 30, the EPC 20 transmits the handover response to the wireless base station X 10 (S110). Receiving the handover response from the EPC 20, the wired transmitting and receiving unit 120 of the wireless base station X 10 outputs the handover response to the handover responding section 114 of the call control unit 110 (S111). The handover responding section 114 outputs the handover response to the setting information acquiring section 131 of the link control determining unit 130 (S113), while transmitting the handover response to the mobile communication terminal 40 through the wireless transmitting and receiving unit 100 (S112 and S114). The setting information acquiring section 131 stores the inter-station link setting information (an IP address and a port number) of the wireless base station Y 30, included in the handover response, in the wireless base station information 150.

Receiving the handover response from the wireless base station X 10, the mobile communication terminal 40 establishes a wireless path to the wireless base station Y 30, and transmits a handover completion notification to the wireless base station Y 30 (S115). Receiving the handover completion notification from the mobile communication terminal 40, the wireless transmitting and receiving unit 300 of the wireless base station Y 30 outputs the handover completion notification to the handover responding section 314 of the call control unit 310 (S116). Acquiring the handover completion notification, the handover responding section 314 transmits a path switch request to the EPC 20 through the wired transmitting and receiving unit 320 (S117 to S118).

Receiving the path switch request from the wireless base station Y 30, the EPC 20 establishes a wired path to the wireless base station Y 30, and transmits a path switch response to the wireless base station Y 30 (S119). Receiving the path switch response from the EPC 20, the wired transmitting and receiving unit 320 of the wireless base station Y 30 outputs the path switch response to the handover responding section 314 of the call control unit 310 (S120). Acquiring the path switch response, the handover responding section 314 transmits the path switch request made to the wireless base station X 10, to the EPC 20 through the wired transmitting and receiving unit 320 (S121 to S122).

Receiving the path switch request from the wireless base station Y 30, the EPC 20 transmits the path switch request to the wireless base station X 10 (S123). Receiving the path switch request from the EPC 20, the wired transmitting and receiving unit 120 of the wireless base station X 10 outputs the path switch request to the handover responding section 114 of the call control unit 110 (S124). Acquiring the path switch request, the handover responding section 114 switches the path, and outputs a handover termination notification to the link control determining unit 130 (S125). Acquiring the handover termination notification from the handover responding section 114, the handover termination acquiring section 132 of the link control determining unit 130 increments the number of performed S1 handovers by one, and stores the incremented number in the handover execution information 160.

FIG. 10 depicts a sequence of a process for setting an inter-station link in the communication control system according to the first embodiment. Such an inter-station link setting process is started as triggered by activating the inter-station link setting request command at a predetermined time.

Acquiring the inter-station link setting request command made to the wireless base station Y 30, the setting request determining section 133 performs the process for determining an inter-station link setting request (S126). In other words, the setting request determining section 133 determines whether an inter-station link has been set to the wireless base station Y 30. If no inter-station link has been set to the wireless base station Y 30, the setting request determining section 133 determines whether the number of S1 handovers made to the wireless base station Y 30 is equal to or greater than a predetermined number. If the number of performed S1 handovers is equal to or greater than the predetermined number, the setting request determining section 133 outputs an inter-station link setting request to the setting requesting section 141 of the inter-station link control unit 140 (S127).

Acquiring the inter-station link setting request from the setting request determining section 133, the setting requesting section 141 of the inter-station link control unit 140 transmits an SCTP link setting request to the wireless base station Y 30 through the wired transmitting and receiving unit 120 (S128 to S129).

Acquiring the SCTP link setting request from the wireless base station X 10, the wired transmitting and receiving unit 320 of the wireless base station Y 30 outputs the SCTP link setting request to the setting responding section 342 of the inter-station link control unit 340 (S130). Acquiring the SCTP link setting request from the wired transmitting and receiving unit 320, the setting responding section 342 sets an inter-station link to the wireless base station X 10, and outputs an SCTP link setting response to the wired transmitting and receiving unit 320 (S131). Acquiring the SCTP link setting response from the setting responding section 342, the wired transmitting and receiving unit 320 transmits the SCTP link setting response to the wireless base station X 10 (S132).

Acquiring the SCTP link setting response from the wireless base station Y 30, the wired transmitting and receiving unit 120 of the wireless base station X 10 outputs the SCTP link setting response to the setting responding section 142 of the inter-station link control unit 140 (S133). Acquiring the SCTP link setting response from the wired transmitting and receiving unit 120, the setting responding section 142 updates the inter-station link setting state of the wireless base station Y 30 from "unset" to "set" in the wireless base station information 150.

The forgoing describes the inter-station link setting process as being started by activating the inter-station link setting request command at a predetermined time. The inter-station link setting process is not limited to this, and may be started when the handover termination acquiring section 132 outputs the inter-station link setting request command, or may be started when the inter-station link setting request command is made irregularly. Further, the foregoing describes the inter-station link setting process performed only on the wireless base station Y 30. The inter-station link setting process is not limited to this, and may be performed on all wireless base stations stored in the wireless base station information 150.

Figure 11:
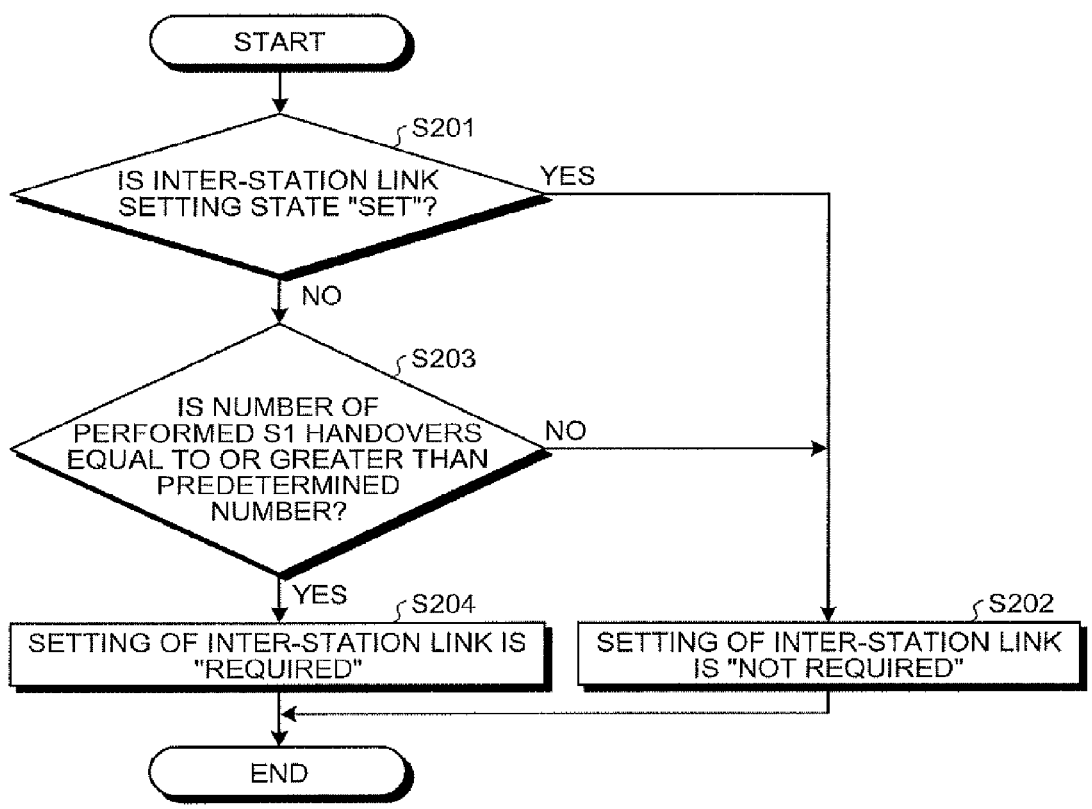
FIG. 11 is a flowchart of a process for determining an inter-station link setting request according to the first embodiment.

Referring to FIG. 11, the following describes the process for determining an inter-station link setting request according to the first embodiment. FIG. 11 is a flowchart of the process for determining an inter-station link setting request according to the first embodiment. The process for determining an inter-station link setting request is performed only on the wireless base station Y 30.

Acquiring the inter-station link setting request command for setting an inter-station link to the wireless base station Y 30, the setting request determining section 133 determines whether an inter-station link has been set to the wireless base station Y 30 (S201). Specifically, the setting request determining section 133 refers to the inter-station link setting information of the wireless base station Y 30 stored in the wireless base station information 150, so as to determine whether the inter-station link setting information indicates "set" or "unset".

If the inter-station link setting state of the wireless base station Y 30 is "set" (YES at S201), the setting request determining section 133 determines that setting of an inter-station link is "not required" (S202). Because the link has been established to the wireless base station Y 30, the setting request determining section 133 terminates the process for determining an inter-station link setting request.

On the contrary, if the inter-station link setting state of the wireless base station Y 30 is not "set" (NO at S201), the setting request determining section 133 determines whether the number of S1 handovers made to the wireless base station Y 30 is equal to or greater than a predetermined number (S203). Specifically, the setting request determining section 133 refers to the number of S1 handovers made to the wireless base station Y 30 stored in the handover execution information 160, so as to determine whether the number of performed S1 handovers is equal to or greater than a predetermined number, for example, 10.

When the number of performed S1 handovers is less than ten (NO at S203), the setting request determining section 133 determines that setting of an inter-station link is "not required" (S202). Because S1 handover is not performed frequently and thus no processing load is imposed on the EPC 20, the setting request determining section 133 terminates the process for determining an inter-station link setting request.

On the contrary, if the number of performed S1 handovers is equal to or greater than ten (YES at S203), the setting request determining section 133 determines that setting of an inter-station link is "required" (S204), and terminates the process for determining an inter-station link setting request.

When setting of an inter-station link is "required", the setting request determining section 133 outputs an inter-station link setting request made to the wireless base station Y 30 to the setting requesting section 141. The setting requesting section 141 outputs the inter-station link setting request to set an inter-station link to the wireless base station Y 30, to the wireless base station Y 30 through the wired transmitting and receiving unit 120. Accordingly, the wireless base station Y 30 sets the inter-station link.

In this way, the wireless base station X 10 can establish the link to the wireless base station Y 30, and thus can make the next handover to the wireless base station Y 30 using X2 handover, not S1 handover. This reduces the processing load on the EPC 20. Further, if the number of performed S1 handovers is less than a predetermined number, the wireless base station X 10 does not establish a link to the wireless base station Y 30, thus allowing the wireless base station X 10 not to use resources necessary for setting an inter-station link. This enables efficient use of the resources allocated to the inter-station link.

According to the first embodiment, when the mobile communication terminal 40 makes a request to switch a communication recipient from the wireless base station X 10 to the wireless base station Y 30, the wireless base station X 10 determines whether an inter-station link has been set to the wireless base station Y 30. As a result, if no inter-station link has been set to the wireless base station Y 30, the wireless base station X 10 acquires the setting information necessary for setting an inter-station link to the wireless base station Y 30, from the wireless base station Y 30 through the EPC 20. Based on the acquired setting information of the wireless base station Y 30, the wireless base station X 10 requests the wireless base station Y 30 to set an inter-station link thereto.

In this way, after the direct link is set to the wireless base station Y 30, the wireless base station X 10 can perform switching of the wireless path directly with the wireless base station Y 30. Thus, when the mobile communication terminal 40 makes a request to switch a communication recipient from the wireless base station X 10 to the wireless base station Y 30, the wireless base station X 10 can perform the switching directly, not through the EPC 20 that is located between the wireless base stations X 10 and Y 30 and plays a part in, for example, switching process. This reduces the processing load on the EPC 20.

Second Embodiment

In the first embodiment, when a mobile communication terminal makes an S1 handover from a wireless base station being in wireless communication to a neighboring wireless base station having no inter-station link in the X2 protocol to the wireless base station, the wireless base station requests the neighboring wireless base station to set an inter-station link in the X2 protocol. The present invention is not limited to this, and after an inter-station link in the X2 protocol is set between the wireless base station and the neighboring wireless base station, the wireless base station may determine the execution state of X2 handover, so as to request the neighboring wireless base station to remove the inter-station link.

In a second embodiment of the present invention, after an inter-station link in the X2 protocol is set between a wireless base station and a neighboring wireless base station, the wireless base station determines the execution state of X2 handover, so as to request the neighboring wireless base station to remove the inter-station link.

Figure 12:
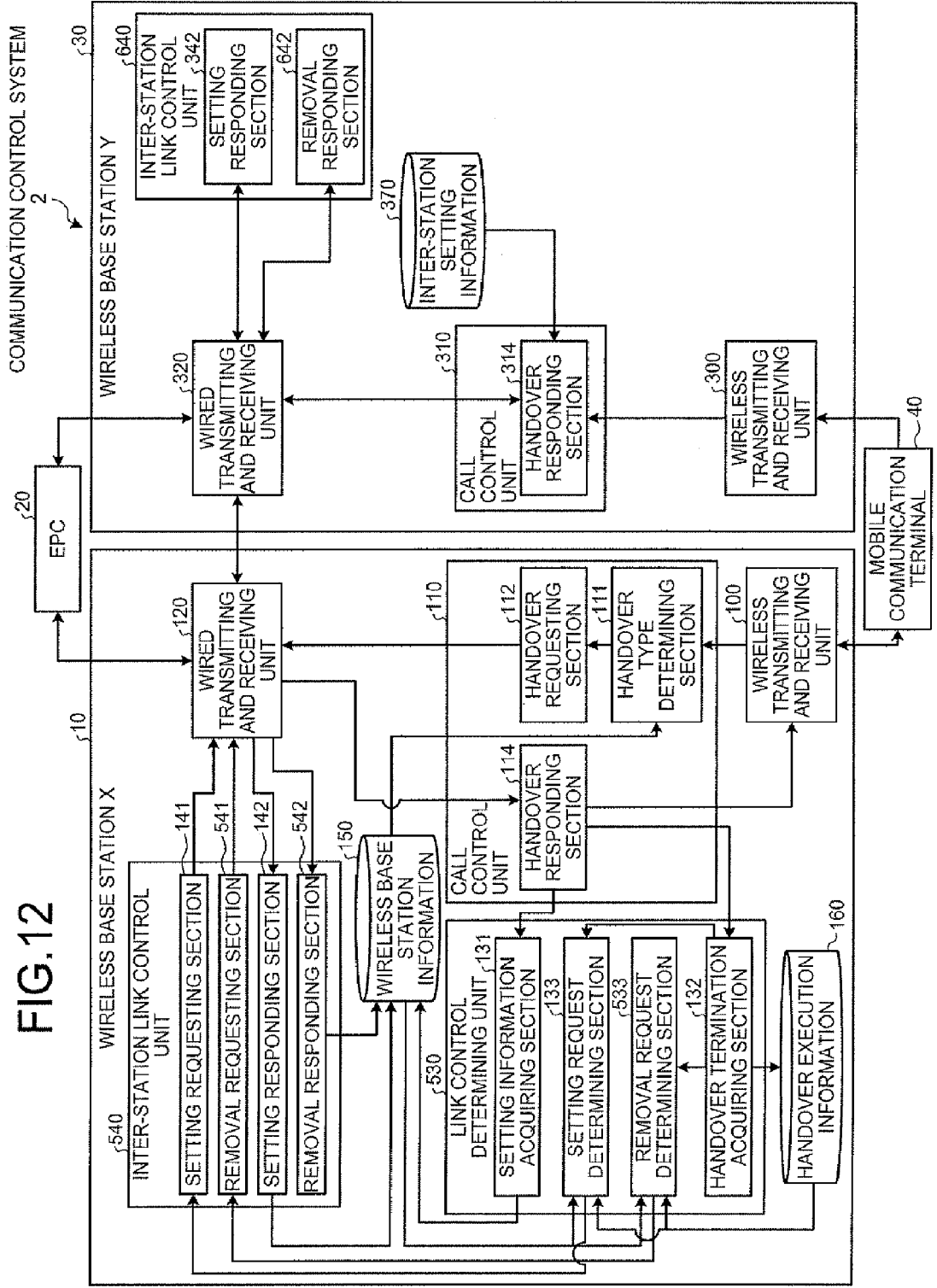
FIG. 12 is a functional block diagram of an entire communication control system according to a second embodiment of the present invention.

Referring to FIG. 12, the following describes an entire structure of a communication control system according to the second embodiment. FIG. 12 is a functional block diagram of an entire communication control system according to the second embodiment. As shown in FIG. 12, a communication control system 2 according to the second embodiment includes a removal request determining section 533, a removal requesting section 541, a removal responding section 542, and a removal responding section 642, in addition to the elements of the communication control system 1 according to the first embodiment (shown in FIG. 6). In FIG. 12, elements being the same as those shown in FIG. 6 are indicated by the same reference numerals, and the detailed descriptions thereof are omitted.

The handover termination acquiring section 132 acquires a handover termination notification made to the wireless base station Y 30 from the handover responding section 114, and then outputs an inter-station link removal request command made to the wireless base station Y 30 to the removal request determining section 533.

The removal request determining section 533 acquires the inter-station link removal request command made to the wireless base station Y 30 from the handover termination acquiring section 132. If the inter-station link removal request command matches the conditions for requesting removal of the inter-station link, the removal request determining section 533 outputs the inter-station link removal request made to the wireless base station Y 30 to the removal requesting section 541. Specifically, the removal request determining section 533 refers to the inter-station setting state stored in the wireless base station information 150 and indicating whether an inter-station link has been set to the wireless base station Y 30, so as to determine whether an inter-station link has been set to the wireless base station Y 30. If an inter-station link has been set to the wireless base station Y 30, the removal request determining section 533 refers to the handover execution information 160 and acquires the number of X2 handovers made to the wireless base station Y 30, so as to determine whether the number of performed X2 handovers is equal to or less than a predetermined number. The predetermined number is the number of X2 handovers performed within a certain period of time and expected to impose no processing load at all on the EPC 20 even if the performed X2 handovers include S1 handovers. The predetermined number is, for example, 2 per hour. When the number of the performed handovers is equal to or less than the predetermined number, the removal request determining section 533 outputs an inter-station link setting request made to the wireless base station Y 30 to the removal requesting section 541. In the foregoing, the removal request determining section 533 determines the inter-station link removal request when acquiring the inter-station link removal request command from the handover termination acquiring section 132. The removal request determining section 533 is not limited to this, and may make the determination regularly or irregularly.

The removal requesting section 541 acquires from the removal request determining section 533 the inter-station link removal request made to the wireless base station Y 30, and then outputs an SCTP link removal request made to the wireless base station Y 30 to the wired transmitting and receiving unit 120. The inter-station link removal request includes an IP address of the current wireless base station X 10, and a port number used to set an inter-station link to the wireless base station Y 30.

The removal responding section 542 acquires an SCTP link removal response made to the wireless base station Y 30 from the wired transmitting and receiving unit 120, and then stores information indicating that the inter-station link to the wireless base station Y 30 has been removed, in the wireless base station information 150.

The removal responding section 642 acquires the SCTP link removal request from the wired transmitting and receiving unit 320, removes the inter-station link to the wireless base station X 10, and outputs an SCTP link removal response to the wired transmitting and receiving unit 320.

The wired transmitting and receiving unit 120 acquires the SCTP link removal request made to the wireless base station Y 30 from the removal requesting section 541, and then transmits the SCTP link removal request to the wireless base station Y 30. Further, the wired transmitting and receiving unit 120 receives the SCTP link removal response to the SCTP link removal request from the wireless base station Y 30, and outputs the SCTP link removal response to the removal responding section 542.

The wired transmitting and receiving unit 320 receives the SCTP link removal request made to the current wireless base station from the wireless base station X 10, and then outputs the SCTP link removal request to the removal responding section 642 to cancel the link to the wireless base station X 10. Further, the wired transmitting and receiving unit 320 acquires an SCTP link removal response to the SCTP link removal request from the removal responding section 642, and transmits the SCTP link removal response to the wireless base station X 10.

Figure 13:
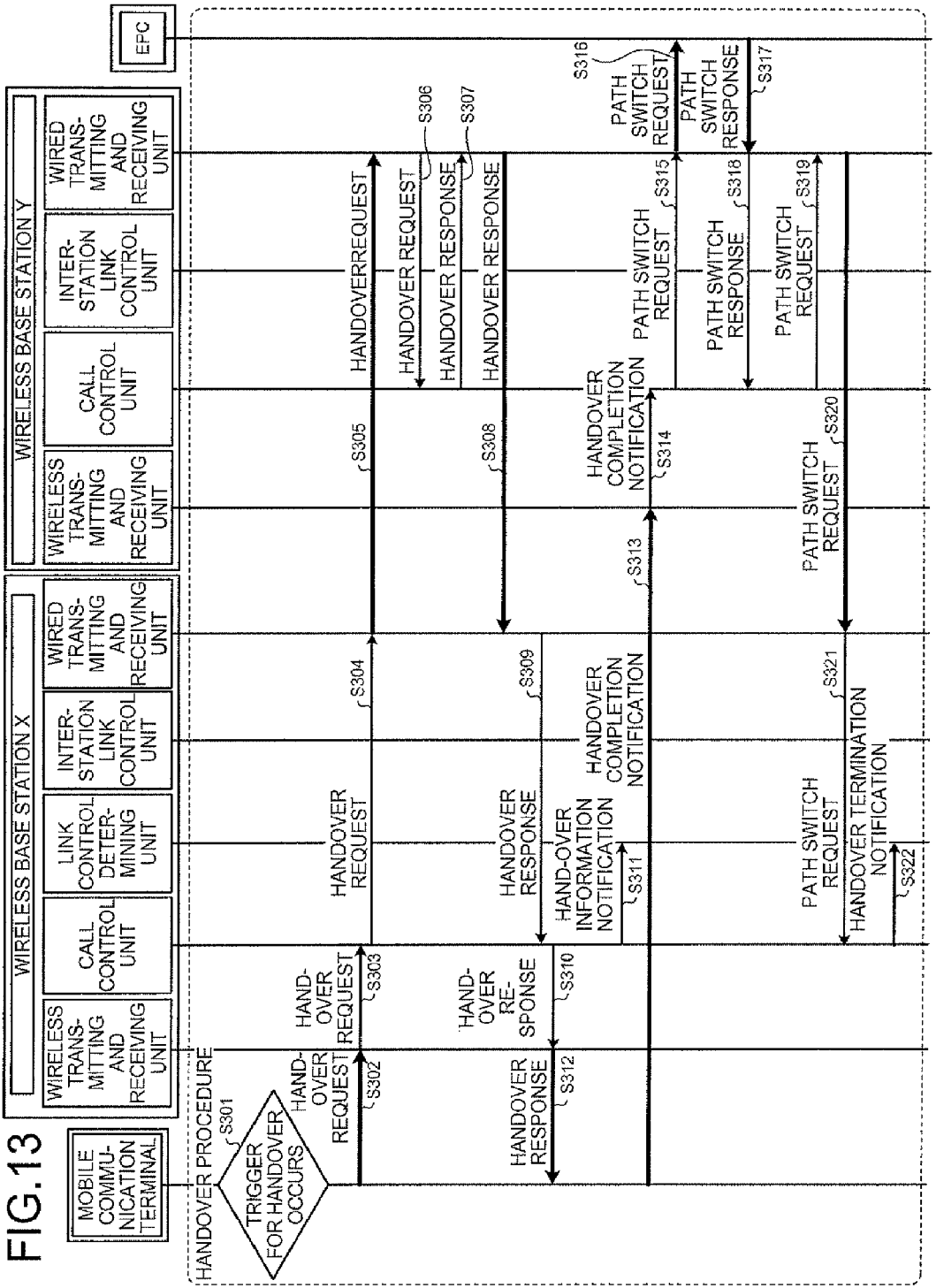
FIG. 13 is a sequence diagram of a handover procedure performed by the communication control system shown in FIG. 12.
Figure 14:
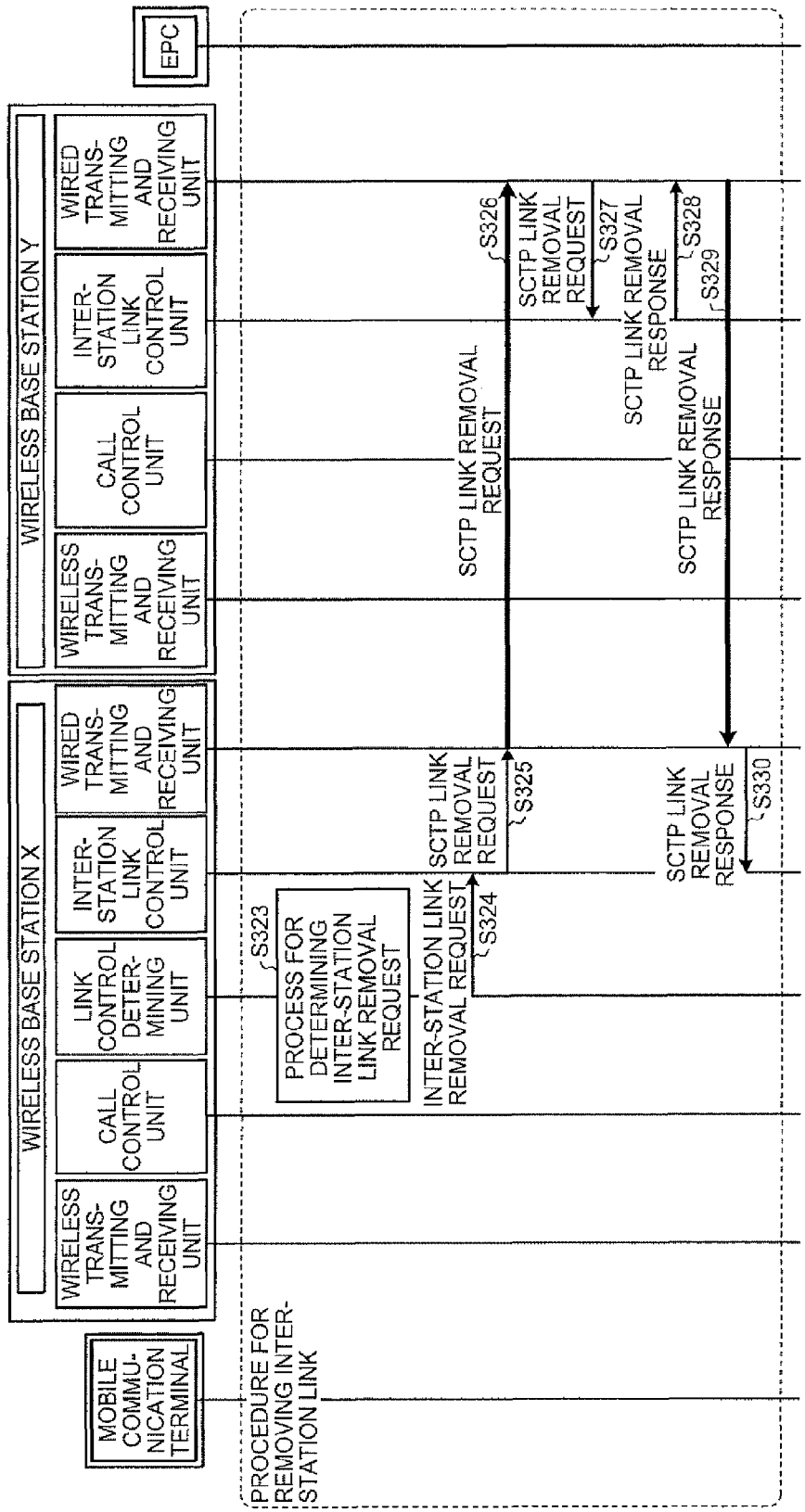
FIG. 14 is a sequence diagram of a procedure for removing an inter-station link in the communication control system shown in FIG. 12.

Referring to FIGS. 13 and 14, the following describes an entire process sequence performed by the communication control system according to the second embodiment. FIG. 13 depicts a handover procedure performed by the communication control system, and FIG. 14 depicts a procedure for removing an inter-station link. The mobile communication terminal 40 is in wireless communication with the wireless base station X 10. Further, the wireless base station X 10 has an inter-station link in the X2 protocol to the wireless base station Y 30.

FIG. 13 depicts a sequence of a handover procedure performed by the communication control system according to the second embodiment.

When a user moves geographically for example, and enters a control region of the wireless base station Y 30, a trigger for handover occurs in the mobile communication terminal 40 (S301). The mobile communication terminal 40 then transmits a handover request to the wireless base station X 10 (S302).

Receiving the handover request, the wireless transmitting and receiving unit 100 of the wireless base station X 10 outputs the handover request to the handover type determining section 111 of the call control unit 110 (S303).

The handover type determining section 111 of the call control unit 110 refers to the inter-station setting state stored in the wireless base station information 150, so as to determine whether an inter-station link has been set to the wireless base station Y 30. When an inter-station link has been set to the wireless base station Y 30, the handover type determining section 111 has already acquired the setting information necessary for setting the inter-station link. Thus, the handover type determining section 111 transmits a handover request including information indicating that a request for the setting information necessary for setting the inter-station link is not required, to the wireless base station Y 30 through the wired transmitting and receiving unit 120 (S304 to S305).

Receiving the handover request from the wireless base station X 10, the wired transmitting and receiving unit 320 of the wireless base station Y 30 outputs the handover request to the handover responding section 314 of the call control unit 310 (S306). Because the request for the inter-station link setting information is not required, the handover responding section 314 transmits a handover response not including the inter-station link setting information, to the wireless base station X 10 through the wired transmitting and receiving unit 320 (S307 to S308).

Receiving the handover response from the wireless base station Y 30, the wired transmitting and receiving unit 120 of the wireless base station X 10 outputs the handover response to the handover responding section 114 of the call control unit 110 (S309). The handover responding section 114 outputs the handover response to the setting information acquiring section 131 of the link control determining unit 530 (S311), while transmitting the handover response to the mobile communication terminal 40 through the wireless transmitting and receiving unit 100 (S310 and S312). The setting information acquiring section 131 performs no process because the handover response does not include the setting information for setting the inter-station link to the wireless base station Y 30.

Receiving the handover response from the wireless base station X 10, the mobile communication terminal 40 establishes a wireless path to the wireless base station Y 30, and transmits a handover completion notification to the wireless base station Y 30 (S313). Receiving the handover completion notification from the mobile communication terminal 40, the wireless transmitting and receiving unit 300 of the wireless base station Y 30 outputs the handover completion notification to the handover responding section 314 of the call control unit 310 (S314). Acquiring the handover completion notification, the handover responding section 314 transmits a path switch request to the EPC 20 through the wired transmitting and receiving unit 320 (S315 to S316).

Receiving the path switch request from the wireless base station Y 30, the EPC 20 establishes a wired path to the wireless base station Y 30, and transmits a path switch response to the wireless base station Y 30 (S317). Receiving the path switch response from the EPC 20, the wired transmitting and receiving unit 320 of the wireless base station Y 30 outputs the path switch response to the handover responding section 314 of the call control unit 310 (S318). Acquiring the path switch response, the handover responding section 314 transmits a path switch request made to the wireless base station X 10, to the wireless base station X 10 through the wired transmitting and receiving unit 320 (S319 to S320).

Receiving the path switch request from the wireless base station Y 30, the wired transmitting and receiving unit 120 of the wireless base station X 10 outputs the path switch request to the handover responding section 114 of the call control unit 110 (S321). Acquiring the path switch request, the handover responding section 114 switches the path, and outputs a handover termination notification to a link control determining unit 530 (S322). Acquiring the handover termination notification from the handover responding section 114, the handover termination acquiring section 132 of the link control determining unit 530 increments the number of performed X2 handovers by one, and stores the incremented number in the handover execution information 160.

FIG. 14 depicts a sequence of an inter-station link removal process in the communication control system according to the second embodiment. The inter-station link removal process is started as triggered by activating the inter-station link removal request command at a predetermined time.

Acquiring the inter-station link removal request command made to the wireless base station Y 30, the removal request determining section 533 determines an inter-station link removal request (S323). In other words, the removal request determining section 533 determines whether an inter-station link has been set to the wireless base station Y 30. If an inter-station link has been set to the wireless base station Y 30, the removal request determining section 533 determines whether the number of X2 handovers made to the wireless base station Y 30 is equal to or less than a predetermined number. If the number of the performed X2 handovers is equal to or less than the predetermined number, the removal request determining section 533 outputs the inter-station link removal request to the removal requesting section 541 of an inter-station link control unit 540 (S324).

Acquiring the inter-station link removal request from the removal request determining section 533, the removal requesting section 541 of the inter-station link control unit 540 transmits an SCTP link removal request to the wireless base station Y 30 through the wired transmitting and receiving unit 120 (S325 to S326).

Acquiring the SCTP link removal request from the wireless base station X 10, the wired transmitting and receiving unit 320 of the wireless base station Y 30 outputs the SCTP link removal request to the removal responding section 642 of an inter-station link control unit 640 (S327). Acquiring the SCTP link removal request from the wired transmitting and receiving unit 320, the removal responding section 642 removes the inter-station link to the wireless base station X 10, and outputs an SCTP link removal response to the wired transmitting and receiving unit 320 (S328). Acquiring the SCTP link removal response from the removal responding section 642, the wired transmitting and receiving unit 320 transmits the SCTP link removal response to the wireless base station X 10 (S329).

Acquiring the SCTP link setting response from the wireless base station Y 30, the wired transmitting and receiving unit 120 of the wireless base station X 10 outputs the SCTP link removal response to the removal responding section 542 of the inter-station link control unit 540 (S330). The removal responding section 542 acquires the SCTP link removal response from the wired transmitting and receiving unit 120, and updates the inter-station setting state of the wireless base station Y 30 from "set" to "unset" in the wireless base station information 150.

The forgoing describes the inter-station link removal process as being started by activating the inter-station link removal request command at a predetermined time. The inter-station link removal process is not limited to this, and may be started when the handover termination acquiring section 132 outputs the inter-station link removal request command, or may be started when the inter-station link removal request command is made irregularly. Further, the foregoing describes the inter-station link removal process performed only on the wireless base station Y 30. The inter-station link setting process is not limited to this, and may be performed on all wireless base stations stored in the wireless base station information 150.

Figure 15:
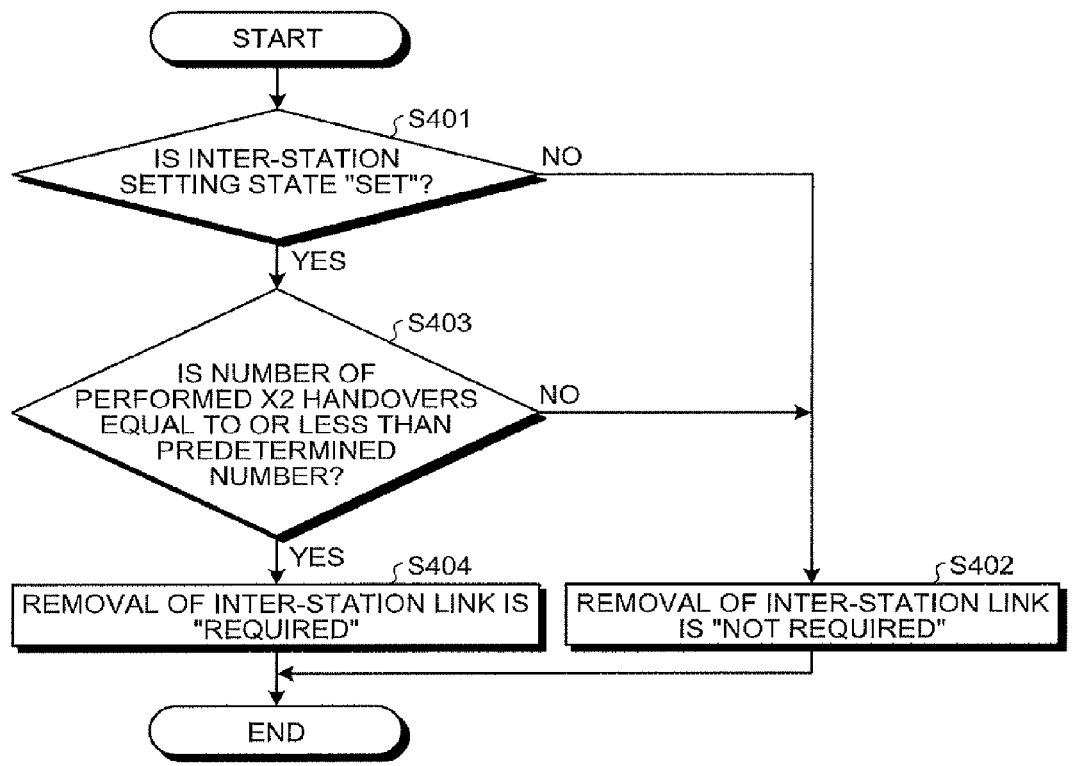
FIG. 15 is a flowchart of the process for determining an inter-station link removal request according to the second embodiment.
Figure 16:
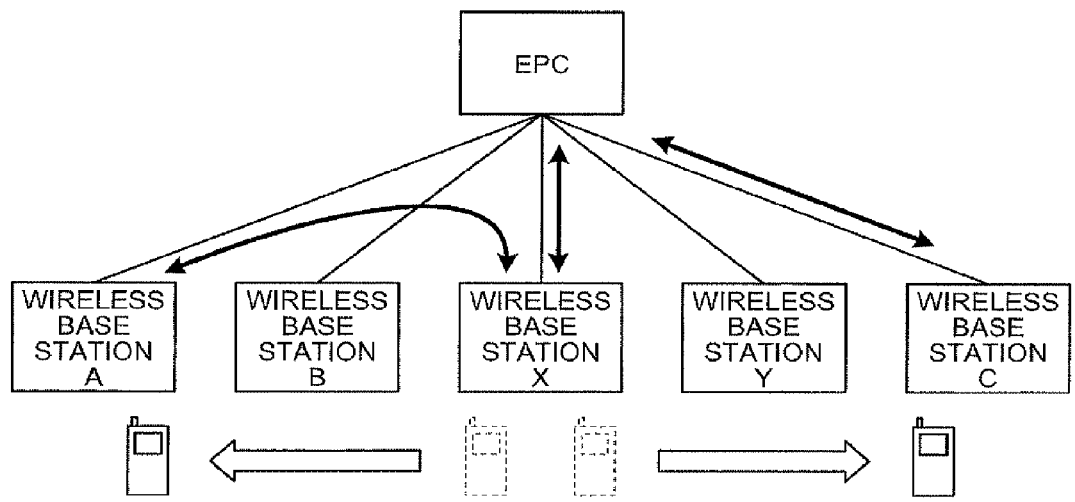
FIG. 16 is a drawing for explaining conventional handover operations.
Figure 17:
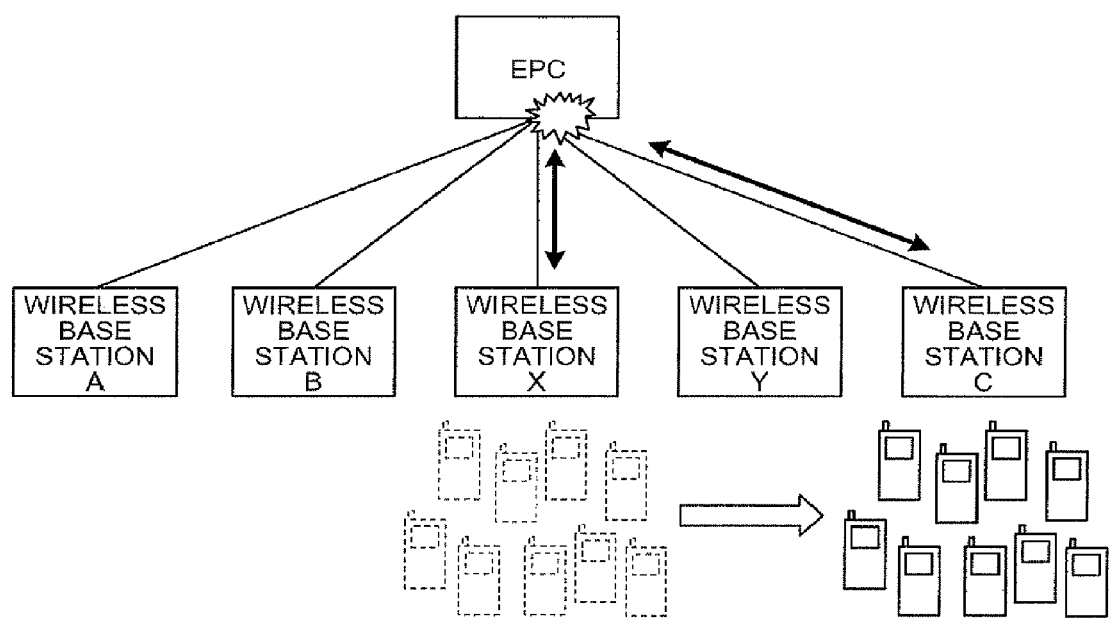
FIG. 17 is a drawing depicting a problem of conventional handover operations.

Referring to FIG. 15, the following describes the process for determining an inter-station link removal request according to the second embodiment. FIG. 15 is a flowchart of the process for determining an inter-station link removal request according to the second embodiment. The process for determining an inter-station link removal request is performed only on the wireless base station Y 30.

Acquiring a request command for removing an inter-station link to the wireless base station Y 30, the removal request determining section 533 determines whether an inter-station link has been set to the wireless base station Y 30 (S401). Specifically, the removal request determining section 533 refers to the inter-station link setting information of the wireless base station Y 30 stored in the wireless base station information 150, so as to determine whether the inter-station link setting information indicates "set" or "unset".

If the inter-station link setting state of the wireless base station Y 30 is not "set" (NO at S401), the removal request determining section 533 determines that removal of the inter-station link is "not required" (S402). Because the link has been established to the wireless base station Y 30, the removal request determining section 533 terminates the process for determining an inter-station link removal request.

On the contrary, if the inter-station link setting state of the wireless base station Y 30 is "set" (YES at S401), the removal request determining section 533 determines whether the number of X2 handovers made to the wireless base station Y 30 is equal to or less than a predetermined number (S403). Specifically, the removal request determining section 533 refers to the number of X2 handovers made to the wireless base station Y 30 stored in the handover execution information 160, so as to determine whether the number of the performed X2 handovers is equal to or less than a predetermined number, for example, not more than two.

When the number of the performed X2 handovers exceeds two (NO at S403), the removal request determining section 533 determines that removal of the inter-station link is "not required" (S402). In this case, X2 handover is performed frequently, and if the inter-station link is removed and switched to S1 handover, the processing load is imposed on the EPC 20. Thus, the process for determining an inter-station link removal request is terminated.

On the contrary, if the number of the performed X2 handovers is equal to or less than two (YES at S403), X2 handover is not performed frequently. In this case, even if the inter-station link is removed and switched to S1 handover, no processing load is imposed on the EPC 20. Thus, the removal request determining section 533 determines that removal of an inter-station link is "required" (S404), and terminates the process for determining an inter-station link removal request.

When removal of the inter-station link is "required", the removal request determining section 533 outputs an inter-station link removal request made to the wireless base station Y 30 to the removal requesting section 541. The removal requesting section 541 outputs the inter-station link removal request made to the wireless base station Y 30, to the wireless base station Y 30 through the wired transmitting and receiving unit 120. Accordingly, the wireless base station Y 30 removes the inter-station link.

In this way, the wireless base station X 10 can dynamically remove and set an inter-station link to the wireless base station Y 30. This prevents an increase in the processing load on the EPC 20 caused by execution of S1 handover. Further, by removing the inter-station link to the wireless base station Y 30, the wireless base station X 10 releases resources necessary for setting the inter-station link. This enables efficient use of the resources allocated to inter-station link.

According to the second embodiment, when the mobile communication terminal 40 makes a request to switch a communication recipient from the wireless base station X 10 to the wireless base station Y 30, the wireless base station X 10 determines whether an inter-station link has been set to the wireless base station Y 30. As a result, if no inter-station link has been set to the wireless base station Y 30, the wireless base station X 10 acquires the setting information necessary for setting an inter-station link to the wireless base station Y 30, from the wireless base station Y 30 through the EPC 20. Based on the acquired setting information of the wireless base station Y 30, the wireless base station X 10 requests the wireless base station Y 30 to set an inter-station link thereto. Further, the wireless base station X 10 counts the number of S1 handovers or the number of X2 handovers, made by a plurality of mobile communication terminals from the current wireless base station X 10 to the wireless base station Y 30. The wireless base station X 10 then determines whether the number of performed X2 handovers exceeds a predetermined number. If the number of performed X2 handovers does not exceed the predetermined number, the wireless base station X 10 requests the wireless base station Y 30 to remove the inter-station link.

In this way, the wireless base station X 10 can dynamically remove and set an inter-station link to the wireless base station Y 30. This prevents an increase in the processing load on the EPC 20 caused by execution of S1 handover. Further, by removing the inter-station link to the wireless base station Y 30, the wireless base station X 10 releases the resources necessary for setting the inter-station link. This enables efficient use of the resources allocated to inter-station link.

As to the processing functions implemented in the wireless base stations X 10 and Y 30, all or any portion of the functions may be implemented by a program interpretable and executable by a central processing unit (CPU), or may be implemented in hardware using wired logic. Further, such a program may be stored in a computer readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless communication system comprising:
   a mobile device which makes a request to switch a communication recipient; and
   a base station apparatus includes:
   a processor; and
   a memory, wherein the processor executes:
   determining whether a direct link has been established between the base station apparatus and another base station apparatus, when the mobile device makes the request to switch the communication recipient from the base station apparatus to the other base station apparatus;
   acquiring, indirectly from the other base station apparatus, link information necessary for establishing the direct link to the other base station apparatus, when the determining determines that no direct link to the other base station apparatus has been established; and
   requesting the other base station apparatus to establish the direct link to the base station apparatus, based on the link information of the other base station apparatus acquired by the acquiring;
   counting number of handovers made using the direct link to the other base station apparatus established in response to the request from the requesting, or number of handovers made using an indirect link to the other base station apparatus, the handovers being made by a plurality of mobile devices each switching a communication recipient from the base station apparatus to the other base station apparatus; and determining whether the number of handovers counted by the counting and made using the indirect link to the other base station apparatus exceeds a predetermined number, wherein the requesting requests the other base station apparatus to establish the direct link to the base station apparatus, when the determining determines that the number of handovers made using the indirect link to the other base station apparatus exceeds the predetermined number.

2. The wireless communication system according to claim 1, wherein the processor further executes:
   determining whether the number of handovers counted by the counting and made using the direct link to the other base station apparatus exceeds a predetermined number; and
   requesting the other base station apparatus to cancel a link to the base station apparatus, when the determining determines that the number of handovers made using the direct link to the other base station apparatus does not exceed the predetermined number.

3. The wireless communication system according to claim 2, wherein the determining determines whether the number of handovers made using the direct link to the other base station apparatus exceeds the predetermined number, when the counting finds an increase in counted handovers made using the direct link to the other base station apparatus.

4. The wireless communication system according to claim 1, wherein the processor further executes:
   storing the link information of the other base station apparatus acquired by the acquiring, wherein
   requesting the other base station apparatus to establish the direct link to the base station apparatus based on the link information of the other base station apparatus stored by the storing, when the determining determines that the number of handovers made using the indirect link to the other base station apparatus exceeds the predetermined number.

5. The wireless communication system according to claim 1, wherein the determining determines whether the number of handovers made using the indirect link to the other base station apparatus exceeds the predetermined number, when the counting finds an increase in counted handovers made using the indirect link to the other base station apparatus.

* * * * *